United States Patent [19]

Holman

[11] 4,373,794

[45] Feb. 15, 1983

[54] CENTER MASK-PERSPECTIVE PHOTOGRAPHY

[76] Inventor: William P. Holman, P.O. Box 12, Ord, Nebr. 68862

[21] Appl. No.: 205,987

[22] Filed: Nov. 12, 1980

[51] Int. Cl.³ .............................................. G03B 1/00
[52] U.S. Cl. ...................................... 354/122; 352/86
[58] Field of Search ...................... 352/86, 43, 57, 60; 350/10, 97; 354/112, 118, 122

[56] References Cited

U.S. PATENT DOCUMENTS 2,630,737  3/1953  Ramsdell ................................ 352/60
3,101,644  8/1963  Lopez-Henriquez ................. 352/86

OTHER PUBLICATIONS

Popular Science, Mar. 1937, "Pill-Box Cap For Lens Produces Odd Photos", p. 18 (?).

Primary Examiner—Monroe H. Hayes

[57] ABSTRACT

A method and apparatus for recording on a photosensitive surface with enhanced vividness and proper perspective is disclosed. The invention is adaptable for use with any type of camera including a television camera and includes the disposition of an opaque mask located on the surface of the camera lens. The mask width is related to the degree of reduction of size of the chief object in a scene by the recording camera. Projection equipment then brings the image back up to life size. Proper perspective for viewing is achieved by determining the viewer's distance from the screen and placing the recording camera at that distance from chief object in scene to be photographed.

2 Claims, 21 Drawing Figures

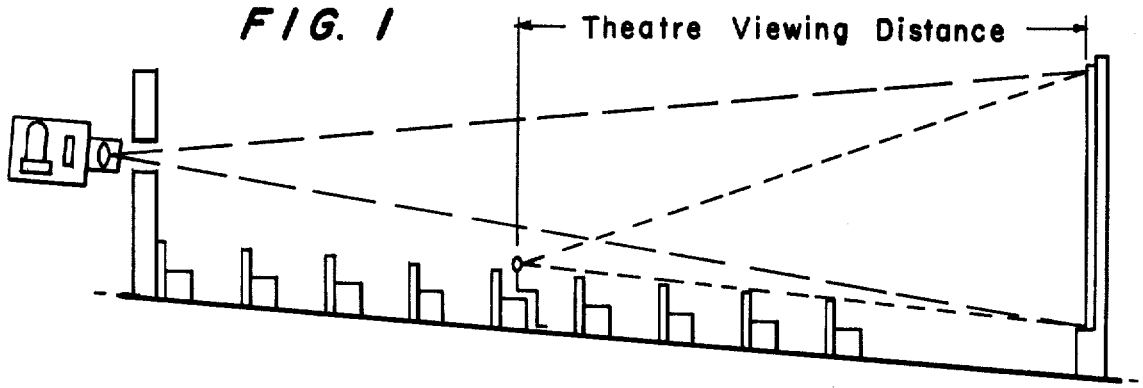
FIG. 1 — Theatre Viewing Distance
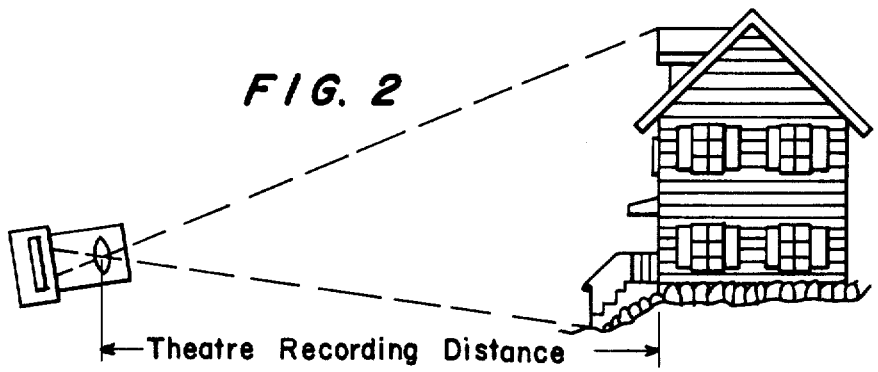
FIG. 2 — Theatre Recording Distance
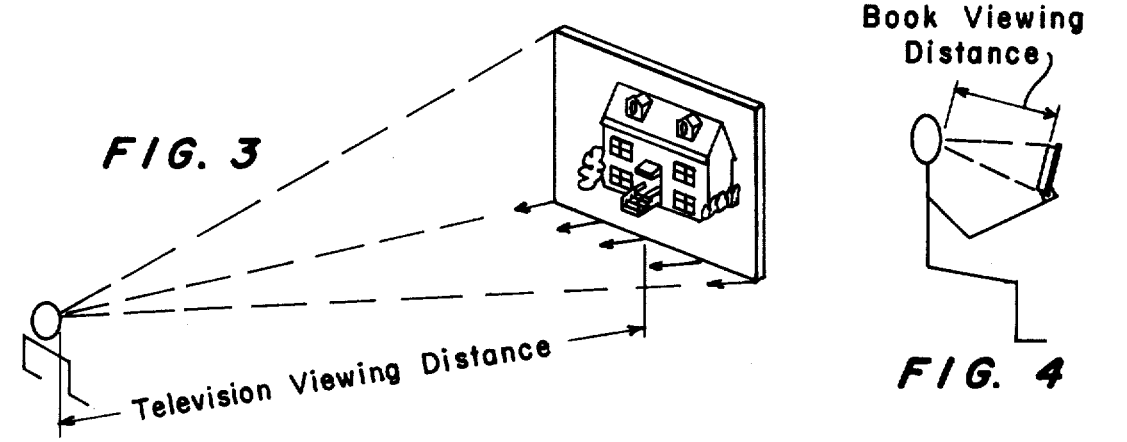
FIG. 3 — Television Viewing Distance
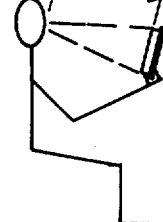
FIG. 4 — Book Viewing Distance
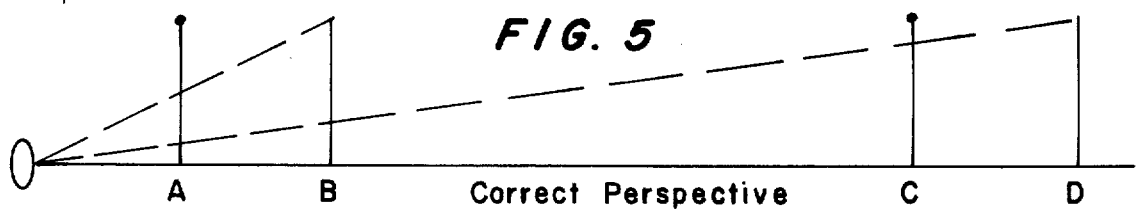
FIG. 5 — Correct Perspective
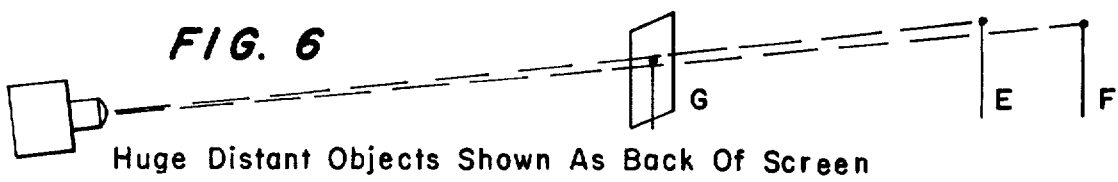
FIG. 6 — Huge Distant Objects Shown As Back Of Screen

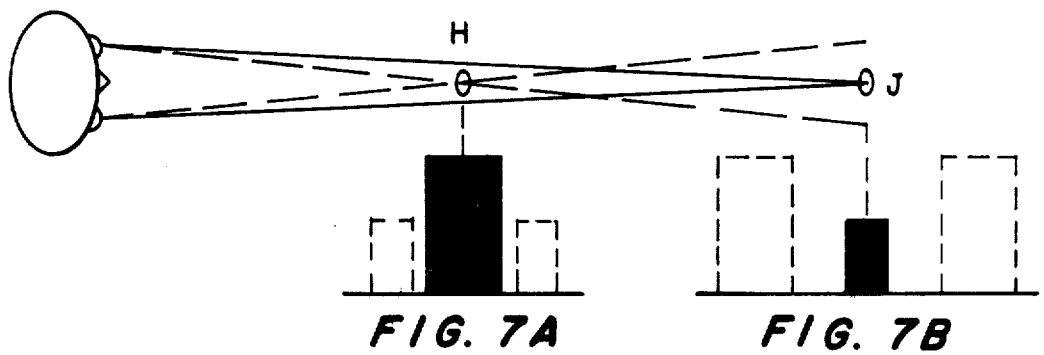
FIG. 7
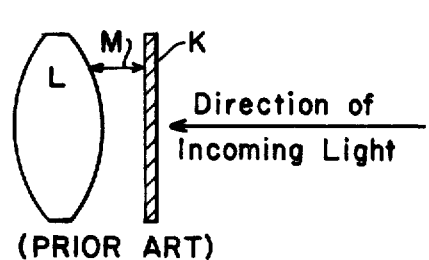
FIG. 7A
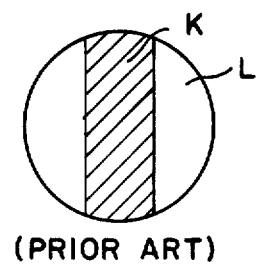
FIG. 7B
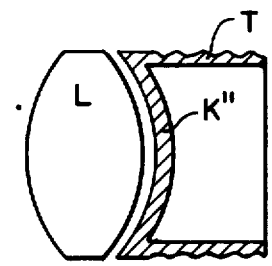
(PRIOR ART)
FIG. 8A
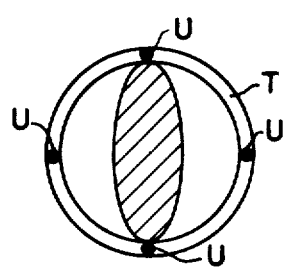
(PRIOR ART)
FIG. 8B
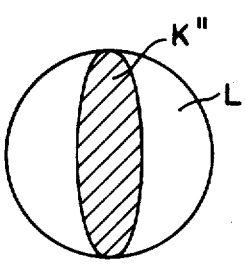
FIG. 9
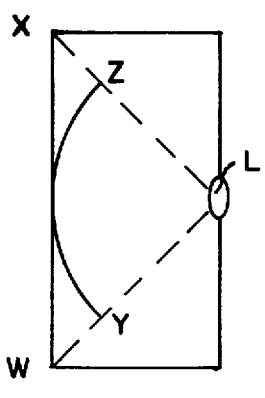
FIG. 13A
FIG. 13B
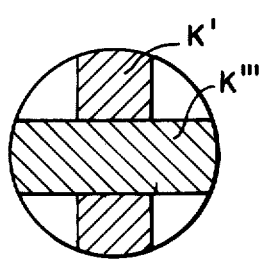
FIG. 10
FIG. 11
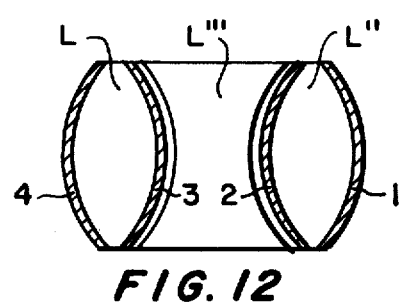
FIG. 12
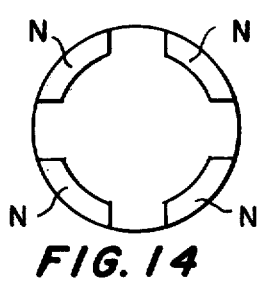
FIG. 14
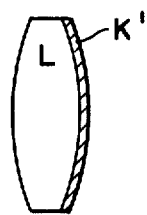
FIG. 16
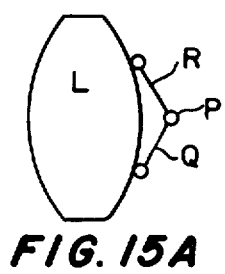
FIG. 15A
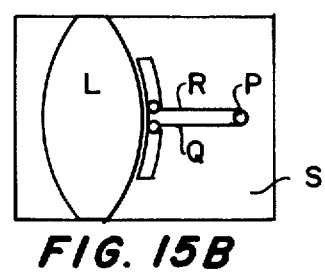
FIG. 15B

CENTER MASK-PERSPECTIVE PHOTOGRAPHY

This invention relates to an image recording system comprising a lens for exposing a photosensitive surface to light for the purpose of recording an image, and the improvement which utilizes an opaque mask substantially juxtaposed to the surface of the lens. The mask covers the central portion of the lens for the purpose of imparting a three-dimension appearance to a display of the recorded image.

The method further includes the step of estimating the average or expected distance between the location of the person or persons who will observe the reproduced image and relating this to the distance of the recording camera from the chief object in the scene to be photographed. Perspective distortions thereby are avoided so that the viewers perspective of the full-sized image will be substantially the same as if looking at objects in real life. The center mask provides twin images as seen by the left and right eyes and automatic convergence of the two lines of sight to whatever element in scene is in sharp focus.

While it has been recognized that it would be desirable to cause the perspective of the image as viewed to correspond to the perspective of objects in real life, a dependable and accurate system therefor has not been forth coming prior to this invention.

Various apparatii have been proposed for producing a three-dimensional effect. Early methods of such photography comprised making two separate photographs. The two photographs were made by placing the lens in a first position and exposing the film and then placing the lens in a second position moved to the side approximately 2 and ½ inches from the first position and photographing the same scene. The photographs then comprise a left side and a right side image so that a person who views the left side with his left eye and the right side with his right eye views the image in perspective.

These early attempts required a special apparatus for viewing the photographs. In moving pictures, for example, left and right images are projected in colors and the audience uses glasses which allow only one color image to reach the left eye and the other color image to reach the right eye. Also, the left and right images may be separated by using polarized light. In either event, the audience uses glasses with special lenses or filters.

The same principal for producing a left image and a right image could be utilized with two television cameras placed a few inches apart with the person viewing the resulting scene looking at a left picture on a first television receiver with his left eye and a right picture on the second receiver with his right eye.

Obvious difficulties with the two image system of recording include the fact that the person viewing the image must have his vision restricted so that the desired image is viewed with the correct eye and not with both eyes. Furthermore, the recording equipment must either be two identical units to permit simultaneous exposure or must be mounted on a stable base so that it can be moved laterally a few inches for a second exposure.

Prior three dimensional equipment then is designed to restrict the left scene to the observer's left eye and the right scene to the observer's right eye. Viewing equipment then enables a single viewer to look into a device which restricts his two eyes to the respective scenes, or must consist of two projectors and have some means such as color or polarization to separate the left and right images. Single viewer apparatii have been available since around 1900 for stereo viewing of pictures. In a stereoptician, the cameras aim straight ahead and converge on infinity, thus causing strain when close objects are studied.

Movies in which the viewer is required to wear glasses to separate the left and right images were not accepted by the public. Also, the possibility of transmitting eye infections made the use of reusable glasses impractical.

As will be described, the mask of the present invention provides automatic convergence of left and right eye lines-of-sight as the camera is focused. As the focus is changed, the convergent angles automatically change and converge on the new point in sharp focus. This is impossible in any other system of photography.

An opaque mask for modifying the image recorded by a single lens during a single exposure was proposed by Walter E. Burton in an article which appeared in Popular Science magazine in March of 1937. The mask there proposed was rigidly constructed in a vertical plane and was placed a considerable distance in front of the lens. The mask intercepted the light rays passing through a vertical band of the lens, which band included the central portion of the lens. The mask then causes two images to be formed on a single photographic film as a composite image, the first image being formed by the left hand side of the lens and the second image being formed by the right hand side of the lens. The two images provided a person viewing the composite a feeling of viewing a three dimensional object.

However, with the rigid mask placed in a vertical plane and spaced well in front of the lens, light rays arriving from the scene may pass the mask at an angle and thereby strike the film on the wrong side. The mask in effect cast too much penumbra and not enough dark shadow on the photographic film.

In contrast, the mask of the present invention differs from the earlier mask by its close juxtaposition to the glass of the lens. In one embodiment of the present invention, the mask is in direct contact with the lens glass. Light rays are thereby prevented from angling behind the opaque mask, and a crisper, sharper definition results. It has been found that the present invention provides a cleaner separation of the two images resulting in an intensified vividness.

In another embodiment of this invention, the mask is located in the center or rear of compound lenses. The mask may be vertical or horizontal if the camera is disposed in a vertical or horizontal position, and may be rectangular, elliptical, or theoretically round, square or other shape.

While the 2 and ½ inches is the normally accepted space between a viewer's eyes, it must be understood that the recording camera will reduce the size of the image from life size to a fraction thereof. Therefore, the width of the center mask is reduced from 2 and ½ inches to a width equivalent to the image reduction achieved by the camera. If the camera reduces an image by a factor of 4, then the width of the center mask will be reduced by the same factor of ¼ of 2 and ½ inches or ⅝ inches.

Also, the system of this invention requires that the distance from the recording camera to the central object to be recorded be approximately the same as the distance between the viewer and the image displayed. In the case of movie houses, it is anticipated that the distance would be about 40 feet. In the case of television cameras, the distance would be about 12 feet. In addition, in the case of books, magazines and the like which would be hand-held, the distance would be about 18 inches.

Accordingly, it is an object of this invention to provide a method which uses life size as the controlling factor throughout the recording and projection process.

It is another object of this invention to provide a method and apparatus for providing motion picture, television, or other photographs of intensified vividness and realism wherein telephoto distortion of rear images and wide angle lens distortion of foreground images are minimized to produce an image closer to that of real life than prior systems.

It is yet another object of this invention to provide a center mask or a photographic lens which will produce images on any photosensitive material which will be vivid and in perspective.

These and other objects will become readily apparent with reference to the drawings and following description wherein:

DESCRIPTION OF THE DRAWINGS

FIG. 1 is a diagram illustrating the normal theater viewing distance;

FIG. 2 is a diagram illustrating the theater recording distance;

FIG. 3 is a diagram illustrating the television viewing distance;

FIG. 4 is a diagram illustrating the book viewing distance;

FIG. 5 is a diagram illustrating the effect of viewing distance on perspective;

FIG. 6 is a diagram illustrating the depicting of huge distance objects in a scene;

FIG. 7 is a diagram illustrating use of the center mask of this invention and its effect on perspective, and FIGS. 7A and 7B are diagrams illustrating the view of objects H and J from FIG. 7;

FIG. 8A is a side view of prior art center mask and FIG. 8B is a front view of the mask and lens of FIG. 8A;

FIG. 9 is a side view of the mask of this invention;

FIG. 10 is a front view of an elliptical center mask of this invention;

FIG. 11 is a front view of a lens in another embodiment of this invention with both horizontal and vertical center mask;

FIG. 12 is a sectional view of a multiple component lens illustrating the positions the mask may occupy according to this invention;

FIGS. 13A and 13B are side and front views, respectively, of the device of this invention with a standard filter holder;

FIG. 14 is a front view of yet another embodiment of this invention showing the camera housing necessary to permit the mask to be mounted either vertically or horizontally;

FIGS. 15A and 15B are top views of an adjustable center mask hinged in the center so that its wings could be in close proximity to the surface of the lens whether contracted or expanded; and, FIG. 16 is a diagram illustrating the principal that curved film in the recording camera with radius equal to focal length achieves less side distortion than film held flat in the camera.

Referring specifically to the drawings and to FIGS. 1–4, FIG. 1 illustrates a standard theater viewing distance which is about 40 feet. This should be contrasted to the standard television viewing distance of FIG. 3, 12 feet, and the standard distance for reading books, magazines or newspapers as shown in FIG. 4 of 18 inches. For example, a motion picture studio camera man makes no pictures to be viewed from 12 feet, a television camera man makes no pictures to be viewed from 40 feet away, or from 18 inches away. A newsman makes no pictures to be viewed from 40 feet away or 12 feet away.

Therefore, to correlate perspective and dual images, these three fundamental basic viewing distances can be established, and pictures tailored for the specific viewing audience. It should also be understood that the audience will not move while viewing and therefore the recording camera can be moved easily and so maintained at the same distance from the object as the audience will be from the projected image on the screen.

As used herein, the word "camera" is intended to include a recording camera, a motion picture camera, or a television camera and the term "projection" or "projector" includes both a motion picture projector and a television set and the image printed in a magazine, book, or the like. It is understood that recording cameras are reducing machines whereby prints are normally about 4 inches or less across whereas projectors are enlarging machines and camera film is projected on a screen several feet across. The concept of this invention uses life size as key factor of both recording and projection systems. Reduction from life size of recording camera determines width of center mask & projection upon screen back up to life size restores the dual images and perspective factors which exist in real life.

In FIG. 2 then, if we take a picture of an object as a house, with the camera located 40 feet away, then the right relationship between the house and other objects on the horizon will be maintained in a theater projection. If we want, for example, a close up of the front door, the close up may be taken through the use of a telephoto lens, and this will not distort distant objects in their relationship to the door.

With attention to FIG. 5, if object B is twice as far from the observer as object A, then its relative image will be one half that of object A. But considering objects C and D, with the distance between them being the same as before, the image of D will be about 1/7 shorter only than the height of object C. Thus, if A or C were standard viewing distances, the camera would be placed at that distance from the object A or C so that background objects will appear in proper perspective. We thus avoid telephoto and wide angle distortions.

With attention to FIG. 6, if far distant objects are to be photographed, the camera distance to object G is the average viewing distance. If objects E and F are distant mountains, we would not try to have them appear as on the surface of the screen life size but allow them to be shown to the rear of the viewing screen even if they are the only objects on the screen.

Therefore, if an object such as a person or an automobile is at the standard viewing distance, and the image size reduction of the camera is correlated to that object, the width of the center mask, as will be subsequently explained, will be correlated. Then, the background objects will appear in proper perspective and dual image relationships.

With attention to FIG. 7, object H is disposed at half the viewing distance as object J. As we shift our focus from one to the other, the one becomes clear and the other becomes perceptible but indistinct. Therefore, as shown in FIG. 7A, focusing on object H will leave object J in dual image indistinct and at about half the size. With attention to FIG. 7B, focusing on object J will leave object H indistinct, about twice the size of object J and in dual image because of the twin converging lines of sight of the two human eyes. FIG. 7A and 7B thus depict the normal pictures to be secured by this invention. 7A is the close object, 7B is the distant one.

With reference to FIGS. 8A and 8B as noted above, it has heretofore been observed that by placing over the lens in a camera a cap with two segments cut out to form an opening the size of the lens except for a strip extending vertically across the middle of the lens to form a mask, upon focusing the camera on an object the photograph of that object will be in sharp focus. However, objects in the foreground and background are given a dual image appearance. With attention to FIG. 8A, the lens L and mask K are separated by a space M. The mask K is spaced a considerable distance in front of the lens L. In this construction, the light rays cross in the space M and thus weaken the vividness of the recorded picture.

According to the present invention, as shown in FIG. 9, this disadvantage is obviated by a lens and mask arrangement wherein the mask K' is in contact with the front surface of the lens L with no space between mask K' and lens L. There is therefore, a sharp delineation of the picture, and as will be obvious to those skilled in the art, felt can be applied between the surface of the mask K' and lens L to avoid scratching the lens.

As shown in FIG. 10, the mask K" may be elliptical instead of rectangular as shown in FIG. 8B. The mask K" will allow more light through lens L, and has been found to provide equivalent pictures. Loss of light may limit the maximum width of the mask K' or K" to ⅓ the diameter of the lens. In the case of the mask K", the ⅓ relationship to horizontal widths across the lens would be maintained throughout the height of the lens.

FIG. 11 shows a simultaneous use of horizontal and vertical masks K' and K". The mask of FIG. 11 will provide pictures even though virtually all of the surface thereof is covered.

With attention to FIG. 12, FIG. 12 illustrates a compound lens L, L', and L". The mask of this invention may be positioned in any one of positions 1, 2, 3, or 4 as shown within the scope of this invention.

FIG. 13A shows a cross-section of a center mask of this invention K' on a lens L by a threaded member T. FIG. 13B shows an elliptical mask K" in a standard filter mounting with four lugs, U, instead of the usual three. This allows the mask to be positioned vertically or horizontally as desired for holding the camera either in a vertical position or a horizontal position.

FIG. 14 shows a standard camera housing, N, with grooves cut both vertically and horizontally so that a center mask (not shown) may be slid into place in opposite grooves.

With attention to FIG. 15A, there is shown a variable center mask. The camera housing is provided with a hinge at P and small wings Q and R. When P is close to the surface of the lens, the two wings R and Q will block more light than when P is in the position shown in FIG. 15B. To control movement between the position of FIG. 15A and the position of 15B, overhead and bottom plates S are fastened to the camera housing with curved segments provided therein for the distal portions of wings Q and R. The curved segments will control the location of the hinge element also.

With attention to FIG. 16, FIG. 16 illustrates the effect of curved film, standard in some early cameras, on distortion. The lens L displays on film occupying the arc Y-Z. In flat film cameras the lens L will display on a film covering the line X-W. The distance from W to X is twice the radius of the focal length circle. The arc distance Y-Z is ¼ the circle circumference or at least ⅛ less than the distance W-X. Therefore, flat film camera cause about ⅛ distortion of objects.

The vividness achieved by the method of this invention may be explained as follows:

If the image on the developed film is to be a ¼ life size image and the photograph is to be viewed as in FIG. 4, the camera is positioned 18 inches from the object so as to have the picture taken from normal reading distance. The center mask then is ¼ of the normal 2 and ½ inch eye separation distance or ⅝ inches wide to take a perfect picture. Perspective factors will also relate to this viewing distance. Enlargement then will be four times, so we have the viewed image life size. Thus, all center mask and perspective factors will be in perfect harmony.

In pictures taken according to this invention with a Polaroid 195 camera, the aperture would be f3.8 for a ⅝ inch mask with 1/250 for bright sunshine and color film. With smaller center masks, less blocking of light occurs so apertures may be used allowing greater front to rear sharpness in final pictures. For television camera recording, if the object is smaller than the screen so that it can be shown full size, the camera is placed 12 feet from the object and the degree of reduction of the camera is determined by using the focal length. Therefore, if 12 feet equals 360 millimeters and if the camera lens system has a focal length of 25 mm, then we have a reduction factor of about 14 times, so we use a center mask of 5/2 times 1/14, or 1/6th inch or 4 mm.

The motion picture recording camera located 40 feet from the object and having a focal length of an estimated 50 millimeters may have a reduction factor of 24 to 1. Therefore, the center mask in this instance would be about 1/10 of an inch (2.5 millimeters).

In the alternative, the mask width may be determined on a trial and error basis by taking a single frame from a motion picture negative and determining the reduction factor as compared to the actual object size.

When changes are made in the reduction or enlargement process of the recording-projecting cameras, telephoto or wide angle distortions may arise because the viewing distance of the observer was not considered. Observers cannot move closer to the screen, the T.V., or book while reading as easily as the recording camera can. Therefore, it is necessary to correlate the position in space of the recording camera and have that match the relatively immovable position of the ultimate viewer.

For the purposes of this invention then, the screen or book page is considered as an open window through which the viewer sees objects on the surface of the screen or to the rear thereof to the horizon. It would not be therefore correct to attempt to have an object appear in front of the screen. A bird thus might be shown flying back away from the screen, but never flying over the heads of the viewing audience. The dual images then recorded are linked together to secure a conception of an object having height, width and depth. This series of changing, convergent angle images, plus proper dual vision, perspective, and magnification factors at each inspection point allows memory to provide the viewer with the data needed to secure more vivid pictures.

Hence, the center mask perspective method of this invention through motion pictures allows a series of convergent dual images to be presented to the mind, so a more crisp impression of an object can be secured.

Beautiful stereoptician pictures can be created with the center mask of this invention showing a single composite image has all the elements needed for the mind to secure most of the three dimensional factors which the two eyes normally independently secure and transmit to the mind. To take such pictures, the viewing distance and reduction factor for the camera is determined. The object is then photographed from the viewing distance with the mask width reduced corresponding to the reduction of the camera. Two prints of a single negative are used in the stereopticon and the resulting pictures will be viewed as miniature objects.

To make miniature objects as huge distant ones, as shown in FIG. 5, the apparent distance apart of distant objects will be less. So, objects are moved closer, as regards front-rear separation. Because distant objects have less convergent angle, center mask width would be reduced before taking pictures of the miniature objects. To make huge distant objects appear as small ones, close at hand, the camera is moved closer to them, if possible, or they are separated if possible, so as to increase the relative image size of the closer of the two objects. As closer objects will have greater convergent angle, a wider center mask would be used.

In conclusion then, the method and system of this invention requires the placement of the recording camera at the viewer's distance from the screen and the normal distance will be 40 feet for motion pictures screen, 12 feet for television screen, and 18 inches for book, magazine or any other hand held reading matter. The center mask width then is determined by reducing the normal 2 and ½ inch space between the eyes by the reduction factor of the camera. Therefore, if the camera is intended to display an image ¼ life size, the center mask is reduced by a factor of 4 in width. The center mask of this invention may be either rectangular, elliptical, circular or square and may be mounted in a conventional camera lens attachment whereby it can rotate 90° if the camera is used in a vertical position as compared to the normal horizontal position. The projection system then would bring the image in the system back up to life size.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letter Patent is:

1. Camera apparatus for recording images to be viewed with 3D effect when reproduced and wherein when an image is to be recorded the distance between the lens of the camera and the scene or object to be photographed is set substantially equal to the intended distance between a viewer and a reproduced image of the recorded image during viewing of the reproduced image, said camera apparatus comprising means associated with said lens for recording an image of the scene or object, an opaque mask covering a central portion of said lens, said opaque mask having a long dimension positioned on said lens in a vertical direction relative to said scene or object and a short dimension positioned on said lens in a horizontal direction relative to said scene or object, said long dimension being substantially equal to the diameter of said lens and said short dimension being equal to 2½ inches divided by the reduction ratio of said lens.

2. Camera apparatus as recited in claim 1 and further comprising means for varying said short dimension of said mask.

* * * * *